(12) United States Patent
Imaizumi et al.

(10) Patent No.: US 8,501,335 B2
(45) Date of Patent: Aug. 6, 2013

(54) BATTERY UNIT

(71) Applicants: Minoru Imaizumi, Takasaki (JP); Masanori Yamashita, Takasaki (JP)

(72) Inventors: Minoru Imaizumi, Takasaki (JP); Masanori Yamashita, Takasaki (JP)

(73) Assignee: FDK Twicell Co., Ltd., Takasaki-shi (JP)

( * ) Notice: Subject to any disclaimer, the term of this patent is extended or adjusted under 35 U.S.C. 154(b) by 0 days.

(21) Appl. No.: 13/626,744

(22) Filed: Sep. 25, 2012

(65) Prior Publication Data

US 2013/0078484 A1    Mar. 28, 2013

(30) Foreign Application Priority Data

Sep. 26, 2011   (JP) ................................. 2011-209335

(51) Int. Cl.
*H01M 2/36*    (2006.01)

(52) U.S. Cl.
USPC ................................................ 429/95; 429/7

(58) Field of Classification Search
None
See application file for complete search history.

(56) References Cited

U.S. PATENT DOCUMENTS

| 684,697 | A | * | 10/1901 | Lloyd | 429/90 |
| 5,399,445 | A | * | 3/1995 | Tinker | 429/90 |
| 6,517,967 | B1 | * | 2/2003 | Shrim et al. | 429/148 |
| 6,617,063 | B1 | * | 9/2003 | Ohnishi | 429/7 |
| 6,649,298 | B2 | * | 11/2003 | Hayashi et al. | 429/433 |
| 2009/0155681 | A1 | * | 6/2009 | Lin et al. | 429/163 |

FOREIGN PATENT DOCUMENTS

JP       2002-260606 A    9/2002

* cited by examiner

*Primary Examiner* — Patrick Ryan
*Assistant Examiner* — Jose Colucci Rios
(74) *Attorney, Agent, or Firm* — Marshall, Gerstein & Borun LLP

(57) ABSTRACT

A battery unit 1 comprises cell blocks 20, a circuit board 40 arranged below the cell blocks 20, a metallic receiving member 30 arranged between the cell blocks 20 and the circuit board 40 to receive an electrolyte leaking out of cells 21 constituting the cell blocks 20, an absorbent sheet 51 arranged in the metallic receiving member 30, and pedestals 52 arranged in the metallic receiving member 30 to support the cell blocks 20, thereby positioning the cell blocks 20 not to contact the absorbent sheet 51.

11 Claims, 4 Drawing Sheets

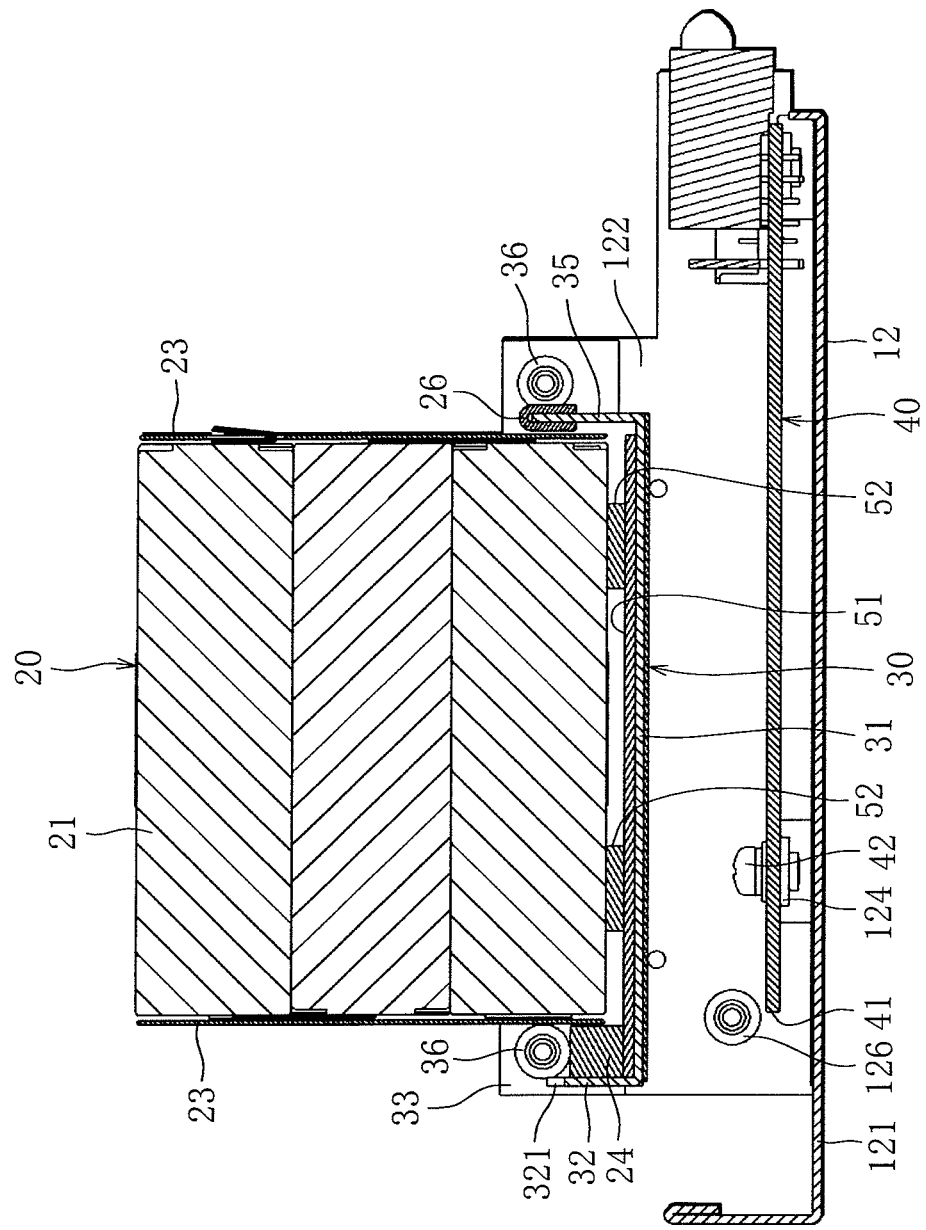

BATTERY UNIT

BACKGROUND OF THE INVENTION

1. Field of the Invention

The present invention relates to a battery unit comprising cells and a circuit board.

2. Description of the Related Art

Generally, cells are designed such that when the cell's internal pressure increases above a certain value due to gases produced by chemical reaction, for example in overdischarge, a safety valve opens to release gases from the cell. In this situation, sometimes an electrolyte leaks out of the cell through the safety valve together with gases. This phenomenon is called an electrolyte leak. In a battery unit comprising cells and a circuit board, when an electrolyte leak occurs and an electrolyte leaking out of the cells contacts the circuit board, it may cause problems, such as short-circuiting, to the circuit board by electrochemical migration, which may lead to a failure, heating, ignition and others.

In order to prevent the electrolyte leaking out of the cells from contacting the circuit board when an electrolyte leak occurs, it is often effective to arrange the circuit board so as not to be below the cells, for example. Arranging the circuit board so as not to be below the cells, however, restricts the freedom of the battery unit's internal layout to a great degree. As a result, a demand for downsizing the battery unit may not satisfactorily be met.

In a publicly-known example of prior technology intended to solve the above problem, a hole is provided in a wall of a cell container so that an electrolyte leaking out of cells is conveyed through the hole to a discharge hole and discharged from a battery unit through the discharge hole (see JP 2002-260606 A). In this prior technology, when an electrolyte leak occurs, the electrolyte leaking out of the cells is discharged from the battery unit by a route not contacting a circuit board, leading to a reduced possibility of the electrolyte leak causing problems such as short-circuiting of the circuit board.

In this prior technology, however, when an electrolyte leak occurs, the electrolyte leaking out of the cells is just discharged, or released from the battery unit through the discharge hole. There remains therefore a possibility that the electrolyte discharged dirties the surroundings.

The present invention has been made in view of the problems described above. An object of the present invention is to provide a battery unit in which an electrolyte leak is unlikely to cause problems such as short-circuiting of a circuit board, and in which an electrolyte leaking out of cells is unlikely to dirty the surroundings.

SUMMARY OF THE INVENTION

An aspect of the present invention is directed to a battery unit comprising cells, a circuit board arranged below the cells, an electrolyte receiver arranged between the cells and the circuit board to receive an electrolyte leaking out of the cells, an absorbing member arranged in the electrolyte receiver, and a cell supporting member arranged in the electrolyte receiver to support the cells, thereby positioning the cells not to contact the absorbing member.

When an electrolyte leak occurs, the electrolyte leaking out of the cells is received in the electrolyte receiver arranged between the cells and the circuit board and absorbed and held by the absorbing member arranged in the electrolyte receiver. This reduces the possibility that the electrolyte leaking out of the cells contacts the circuit board and causes problems such as short-circuiting by electrochemical migration. Further, by being supported by the cell supporting member arranged in the electrolyte receiver, the cells are positioned not to contact the absorbing member. This reduces the possibility that the electrolyte held in the absorbing member causes short-circuiting to the cells. The electrolyte leaking out of the cells into the electrolyte receiver is absorbed and held by the absorbing member. The electrolyte does therefore not leak out of the battery unit at least while it does not exceed the maximum amount that the absorbing member can hold. This reduces the possibility that the electrolyte leaking out of the cells dirties the surroundings.

The present invention can thus realize a battery unit in which an electrolyte leak is unlikely to cause problems such as short-circuiting of a circuit board, and in which an electrolyte leaking out of cells is unlikely to dirty the surroundings.

BRIEF DESCRIPTION OF THE DRAWINGS

The present invention will become more fully understood from the detailed description given hereinafter and the accompanying drawings which are given by way of illustration only, and thus, are not limitative of the present invention, and wherein:

FIG. 4 is a cross-sectional view of the battery unit along line I-I indicated in FIG. 2.

DETAILED DESCRIPTION OF THE INVENTION

With reference to the drawings attached, an embodiment of the present invention will be described below.

Figure 1:
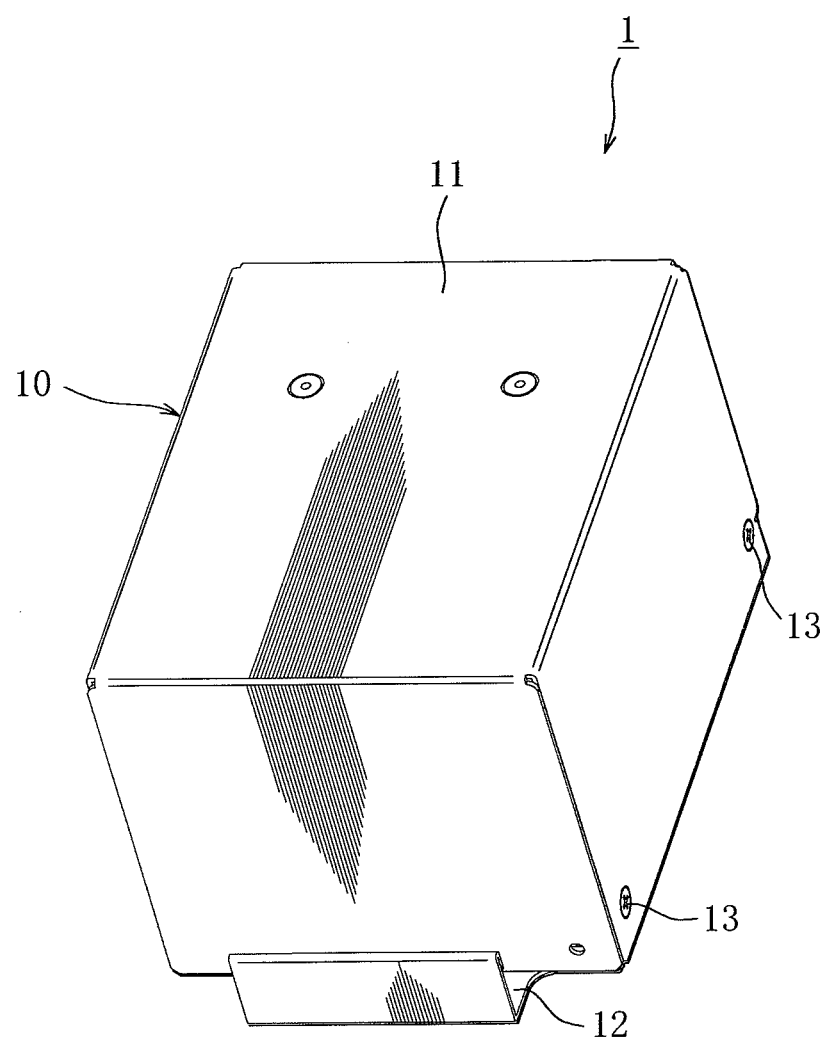
FIG. 1 is a perspective view showing an outer appearance of a battery unit according to the present invention.
Figure 2:
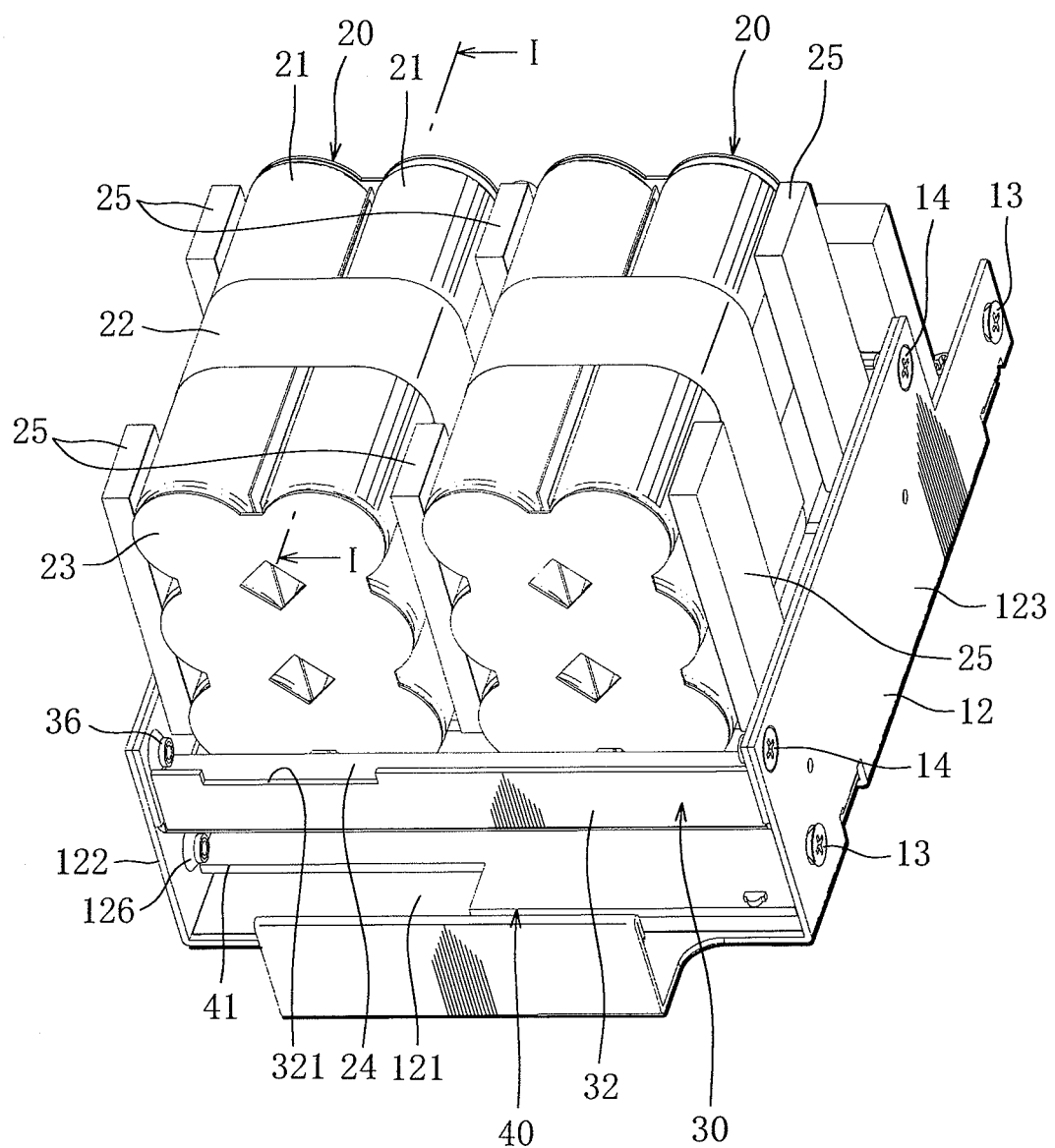
FIG. 2 is a perspective view showing major parts of the battery unit.
Figure 3:
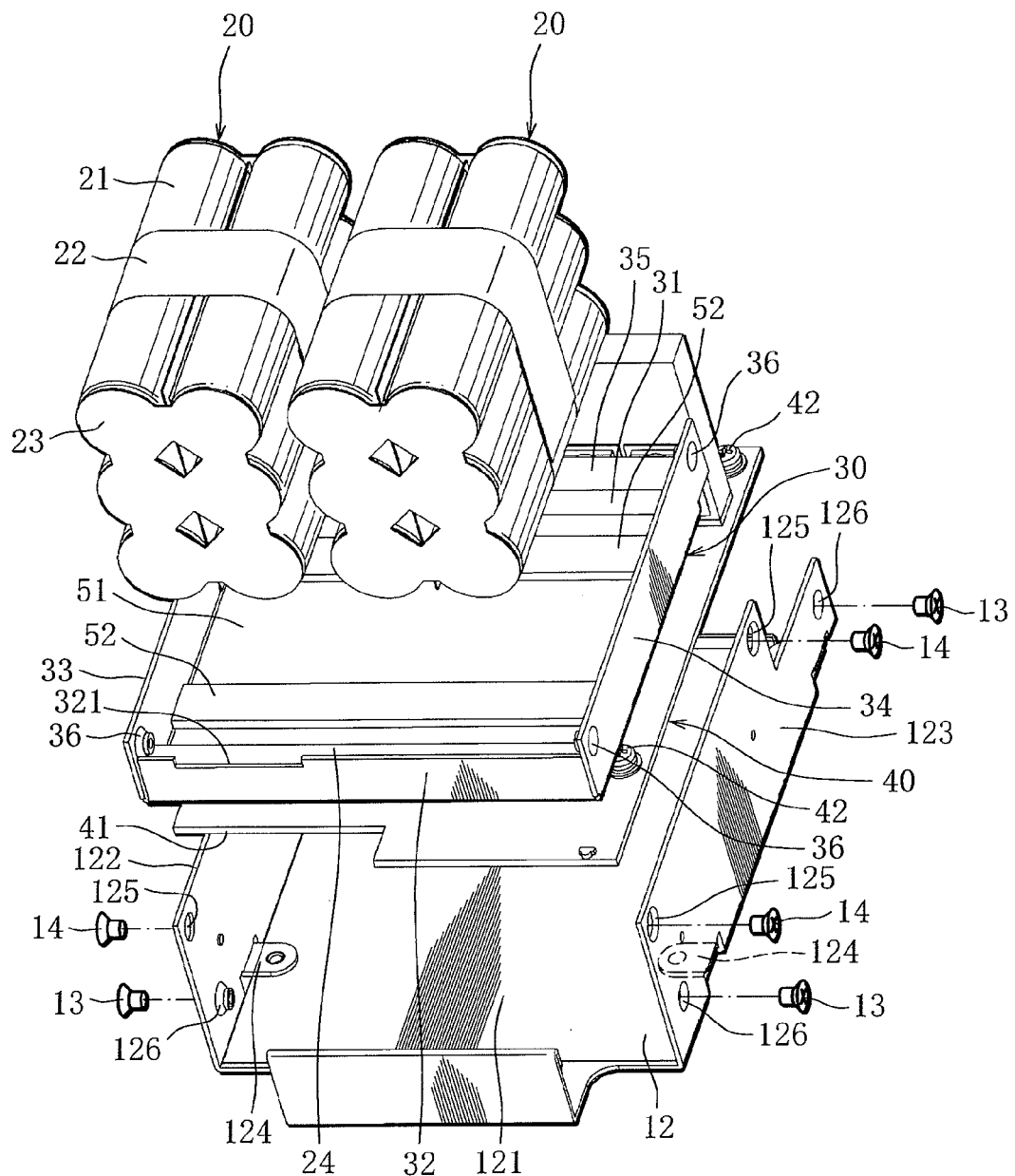
FIG. 3 is an exploded perspective view showing the major parts of the battery unit separated from each other.

FIG. 1 is a perspective view showing an outer appearance of a battery unit 1 according to the present invention, FIG. 2 a perspective view showing major parts of the battery unit 1, FIG. 3 an exploded perspective view showing the major parts of the battery unit 1 separated from each other, and FIG. 4 a cross-sectional view of the battery unit 1 along line I-I indicated in FIG. 2.

The battery unit 1 according to the present invention comprises a casing 10, two cell blocks 20, a metallic receiving member 30, a circuit board 40, an absorbent sheet 51 and two pedestals 52.

The casing 10 is composed of an upper casing 11 and a lower casing 12 each made of a metallic material. The upper casing 11 is in the shape of a box open at the bottom, with two through holes in each side wall for receiving screws. The lower casing 12 has a bottom 121, a left side wall 122 and a right side wall 123. The left side wall 122 and the right side wall 123 of the lower casing 12 each have an inward-projecting tongue 124. Each tongue 124 has a threaded hole. The left side wall 122 and the right side wall 123 of the lower casing 12 each also have two through holes 125 near the upper edge and two threaded holes 126 at the locations corresponding to the screw-receiving through holes in the upper casing 11. The upper casing 11 is fastened to the lower casing 12 by four screws 13 inserted into the threaded holes 126 in the lower casing 12 through the screw-receiving through holes in the upper casing 11.

Two cell blocks 20 are arranged inside the casing 10. More specifically, two cell blocks 20 are arranged in a metallic receiving member 30 which will be described later. Each cell block 20 includes six cells 21, connecting tape 22 and two electrode covers 23. The cells 21 are known secondary cells, such as nickel-hydrogen cells or nickel-cadmium cells. As seen in the drawings, six cells 21 are arranged in two rows and three tiers, alternately oriented oppositely, and held together by connecting tape 22. The six cells 21 are connected in series by wires (not shown). The electrode cover 23 made of an electrical insulating material covers electrodes of the cells 21 to prevent formation of short circuits between the cells 21. A piece 25 of cushioning material is arranged between the inner surface of the upper casing 11 and the opposing side surface of each cell block 20, and between the two cell blocks 20.

A metallic receiving member 30 provided as an "electrolyte receiver" is arranged between the two cell blocks 20 and a circuit board 40 to receive an electrolyte leaking out of the cells 21 constituting the cell blocks 20 when an electrolyte leak occurs. Although in the present embodiment, the receiving member 30 is made of a metallic material, it not restricted to a metallic material; it may be made of any desired material. More specifically, the metallic receiving member 30 is in the shape of a box comprised of a bottom 31, a front wall 32, a left side wall 33, a right side wall 34 and a rear wall 35 and open at the top. The left side wall 33 and the right side wall 34 of the metallic receiving member 30 each have two threaded holes 36. The metallic receiving member 30 is fastened to the lower casing 12 by four screws 14 inserted into the threaded holes 36 in the metallic receiving member 30 through the through holes 125 in the lower casing 12. Between the front surfaces of the two cell blocks 20 and the front wall 32 of the metallic receiving member 30 is arranged a piece 24 of cushioning material, and between the rear surfaces of the two cell blocks 20 and the rear wall 35 of the metallic receiving member 30 is arranged a piece 26 of cushioning material.

The metallic receiving member 30 has a notch 321 in the upper edge of the front wall 32. The notch 321 is provided as an "electrolyte outlet" which allows the electrolyte to flow out of the metallic receiving member 30 along a specified route before overflowing from the metallic receiving member 30.

The circuit board 40 includes circuits for controlling charging and discharging of the cells 21 constituting the two cell blocks 20, and is connected to the two cell blocks 20 by wires, not shown. The circuit board 40 is arranged below the two cell blocks 20. More specifically, the circuit board 40 is fastened to the lower casing 12 by screws 42 inserted into the threaded holes in the tongues 124 of the lower casing 12 through through-holes in the circuit board 40. As seen in the drawings, the circuit board 40 has a notch 41 corresponding to the notch 321 of the metallic receiving member 30.

An absorbent sheet 51 provided as an "absorbing member" is arranged in the metallic receiving member 30 to absorb and hold the electrolyte leaking out of the cells 21 when an electrolyte leak occurs. More specifically, the absorbent sheet 51 is a sheet of an absorbent material such as a low-density foamed paper, and arranged on the inner bottom surface (upper surface of the bottom 31) of the metallic receiving member 30. Desirably, the absorbent sheet 51 is bonded to the inner bottom surface of the metallic receiving member 30. Although this is not an indispensable feature of the present invention, bonding the absorbent sheet 51 to the inner bottom surface of the metallic receiving member 30 reduces the possibility that the absorbent sheet 51 holding the electrolyte lifts from the inner bottom surface of the metallic receiving member 30 and contacts the cells 21 constituting the cell blocks 20, thereby causing short-circuiting to the cells 21 constituting the cell blocks 20.

Two pedestals 52 provided as "cell supporting members" are arranged in the metallic receiving member 30. The pedestals 52 support the two cell blocks 20, thereby positioning them not to contact the absorbent sheet 51. More specifically, the pedestals 52 are rectangular plates with a uniform thickness, made of a foamed material, for example.

In the battery unit 1 configured as described above, when an electrolyte leak occurs, the electrolyte leaking out of the cells 21 constituting the cell blocks 20 is received in the metallic receiving member 30 arranged between the cells 21 constituting the cell blocks 20 and the circuit board 40 and absorbed and held by the absorbent sheet 51 arranged in the metallic receiving member 30. This reduces the possibility that the electrolyte leaking out of the cells 21 constituting the cell blocks 20 contacts the circuit board 40 and causes problems such as short-circuiting by electrochemical migration. Further, being supported by the two pedestals 52 arranged in the metallic receiving member 30, the cell blocks 20 are positioned not to contact the absorbent sheet 51. This reduces the possibility that the electrolyte held in the absorbent sheet 51 causes short-circuiting to the cells 21 constituting the cell blocks 20. The electrolyte leaking out of the cells 21 constituting the cell blocks 20 into the metallic receiving member 30 is absorbed and held by the absorbent sheet 51. The electrolyte does therefore not leak out of the battery unit 1 at least while it does not exceed the maximum amount that the absorbent sheet 51 can hold. This reduces the possibility that the electrolyte leaking out of the cells 21 constituting the cell blocks 20 dirties the surroundings.

The present invention can thus provide a battery unit 1 in which an electrolyte leak is unlikely to cause problems such as short-circuiting of a circuit board 40, and in which an electrolyte leaking out of cells 21 constituting cell blocks 20 is unlikely to dirty the surroundings.

In the battery unit 1 according to the present invention, the metallic receiving member 30 desirably has a notch 321 which allows the electrolyte to flow out of the metallic receiving member 30 along a specified route before overflowing from the metallic receiving member 30, as in the described embodiment. Although this is not an indispensable feature of the present invention, the electrolyte can flow out of the metallic receiving member 30 through the notch 321 before overflowing from the metallic receiving member 30 even if the electrolyte leaks out of the cells 21 constituting the cell blocks 20 in an amount exceeding the estimated maximum, for example. In other words, even when it is inevitable that the electrolyte flows out of the metallic receiving member 30, it is ensured that it flows out along the specified route.

If a notch 41 is formed in the circuit board 40 in an appropriate area (area corresponding to the route which the electrolyte flowing out of the metallic receiving member 30 follows) as in the described embodiment, the electrolyte flowing out of the metallic receiving member 30 through the notch 321 can flow without contacting the circuit board 40. In other words, if the circuit board 40 is designed to avoid the route which the electrolyte flowing out of the metallic receiving member 30 through the notch 321 follows, the electrolyte flowing out of the metallic receiving member 30 does not contact the circuit board 40. This reduces the possibility that the electrolyte causes problems such as short-circuiting by electrochemical migration. Even if the circuit board 40 cannot be provided to avoid the route which the electrolyte flowing out of the metallic receiving member 30 follows, the possibility of the electrolyte causing problems such as short-circuiting by electrochemical migration can be reduced, for example by arranging electronic components on the circuit board 40 in an appropriate layout, for example in a manner such that no electronic components are present in an area corresponding the route which the electrolyte flowing out of the metallic receiving member 30 follows.

Desirably, the notch 321 in the metallic receiving member 30 is located below the two cell blocks 20. Although this is not an indispensable feature of the present invention, if the notch 321 is located below the cell blocks 20, the electrolyte flows out of the metallic receiving member 30 before contacting the cells 21 constituting the cell blocks 20 even when the electrolyte leaks out of the cells 21 constituting the cell blocks 20 in an amount exceeding the estimated maximum, for example. This reduces the possibility that the electrolyte in the metallic receiving member 30 causes short-circuiting to the cells 21 constituting the cell blocks 20.

Desirably, the notch 321 in the metallic receiving member 30 is located above the absorbent sheet 51. Although this is not an indispensable feature of the present invention, if the notch 321 is located above the cell blocks 20, the electrolyte does not flow out of the metallic receiving member 30 at least while the electrolyte leaking out of the cells 21 constituting the cell blocks 20 does not exceed the maximum amount that the absorbent sheet 51 can hold. This reduces the possibility that the electrolyte leaking out of the cells 21 constituting the cell blocks 20 dirties the surroundings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery unit comprising:
   cells,
   a circuit board arranged below the cells,
   an electrolyte receiver arranged between the cells and the circuit board to receive an electrolyte leaking out of the cells,
   an absorbing member arranged in the electrolyte receiver, and
   a cell supporting member arranged in the electrolyte receiver to support the cells, thereby positioning the cells not to contact the absorbing member.

2. A battery unit according to claim 1, wherein the electrolyte receiver has an outlet allowing the electrolyte to flow out of the electrolyte receiver along a specified route before overflowing.

3. A battery unit according to claim 2, wherein the outlet is located below the cells.

4. A battery unit according to claim 2, wherein the outlet is located above the absorbing member.

5. A battery unit according to claim 1, wherein the absorbing member is bonded to an inner bottom surface of the electrolyte receiver.

6. A battery unit comprising:
   cells;
   a circuit board arranged below the cells;
   an electrolyte receiver arranged between the cells and the circuit board, the electrolyte receiver including a bottom and an open top, the bottom arranged to receive an electrolyte leaking out of the cells;
   an absorbent sheet arranged adjacent the bottom of the electrolyte receiver; and
   a cell support comprising a pedestal, the pedestal arranged adjacent the bottom of the electrolyte receiver and between the bottom of the electrolyte receiver and the cells, the pedestal positioned to underlie and support the cells and to position the cells to not contact the absorbent sheet.

7. A battery unit according to claim 6, wherein the electrolyte receiver has an outlet allowing the electrolyte to flow out of the electrolyte receiver along a specified route before overflowing.

8. A battery unit according to claim 7, wherein the outlet is located below the cells.

9. A battery unit according to claim 7, wherein the outlet is located above the absorbent sheet.

10. A battery unit according to claim 6, wherein the absorbent sheet is bonded to the bottom of the electrolyte receiver.

11. A battery unit according to claim 6, wherein the electrolyte receiver comprises a side wall having a notch, the notch forming an electrolyte overflow path, and wherein the circuit board includes a notch corresponding to the notch in the side wall of the electrolyte receiver, the notch in the circuit board arranged to avoid contact between overflowing electrolyte and the circuit board.

* * * * *